United States Patent
Mellado et al.

(10) Patent No.: US 6,927,252 B2
(45) Date of Patent: Aug. 9, 2005

(54) PROCESS TO PRODUCE UNSATURATED POLYESTER POLYOLS

(75) Inventors: Mariano Malaga Mellado, Madrid (ES); Julian Gonzalez Rivero, Madrid (ES)

(73) Assignee: Repsol Quimica, S.A., Madrid (ES)

( * ) Notice: Subject to any disclaimer, the term of this patent is extended or adjusted under 35 U.S.C. 154(b) by 0 days.

(21) Appl. No.: 10/880,142

(22) Filed: Jun. 29, 2004

(65) Prior Publication Data

US 2004/0266977 A1 Dec. 30, 2004

(30) Foreign Application Priority Data

Jun. 30, 2003 (EP) ............................................. 03380157

(51) Int. Cl.$^7$ .............................. C08J 5/10; C08G 63/68
(52) U.S. Cl. ....................... 524/777; 528/275; 528/297; 528/300; 528/306
(58) Field of Search .......................... 524/777; 528/275, 528/297, 300, 306

(56) References Cited

U.S. PATENT DOCUMENTS

| | | |
|---|---|---|
| 3,374,208 A | 3/1968 | Seiner et al. |
| 3,391,092 A | 7/1968 | Worsley et al. |
| 3,427,335 A | 2/1969 | Herold et al. |
| 4,014,846 A | 3/1977 | Ramlow et al. |
| 4,093,573 A | 6/1978 | Ramlow et al. |
| 4,144,395 A | 3/1979 | Murphy et al. |
| 4,550,194 A | 10/1985 | Reichel et al. |
| 4,652,589 A | 3/1987 | Simroth et al. |

*Primary Examiner*—Samuel A. Acquah
(74) *Attorney, Agent, or Firm*—John C. McMahon

(57) ABSTRACT

The process consists of making react (i) an alkylene oxide polyether polyol, (ii) an organic compound which has an ethylenic unsaturation and a hydroxyl, carboxyl, anhydride, isocyanate or epoxy group and (iii) an alkylene oxide selected from ethylene oxide, propylene oxide and mixtures thereof, in the presence of an effective quantity of a potassium naphthenate catalyst. The unsaturated polyester polyols produced have a reduced degree of unsaturation and are useful in the synthesis of polymeric polyols with good viscosity, filterability and particle size properties, suitable for the production of cellular polyurethane compounds.

9 Claims, No Drawings

PROCESS TO PRODUCE UNSATURATED POLYESTER POLYOLS

FIELD OF THE INVENTION

This invention relates to a process to produce unsaturated polyester polyols which consists of making react (i) an alkylene oxide polyether polyol, (ii) an organic compound which has an ethylenic unsaturation and a hydroxyl, carboxyl, anhydride, isocyanate or epoxy group and (iii) an alkylene oxide selected from ethylene oxide, propylene oxide and mixtures thereof, in the presence of an effective quantity of a potassium naphthenate catalyst.

BACKGROUND OF THE INVENTION

The use of unsaturated polyester polyols is known as stabilization precursors in the production of polymeric polyols, which, in turn, can be used in the manufacturing of cellular polyurethane compounds.

The production of unsaturated polyester polyols using the reaction of alkylene oxides with an acid ester produced by the reaction of an unsaturated acid anhydride with an alkylene oxide polyether polyol is sufficiently disclosed in North American patents U.S. Pat. No. 3,391,092, U.S. Pat. No. 4,014,846, U.S. Pat. No. 4,093,573 and U.S. Pat. No. 4,144,395, which disclose processes to produce unsaturated polyester polyols both in the absence of catalysts and in the presence of catalysts (trialkylamines). North American U.S. Pat. No. 3,374,208 discloses the use of several metal catalysts to obtain unsaturated polyester polyols. North American U.S. Pat. No. 4,550,194 discloses the use of calcium or cobalt naphthenate to produce unsaturated polyester polyols with an acid value lower than 0.5 mg KOH/g.

Nevertheless, the state of the art does not show the form to obtain unsaturated polyester polyols with an unsaturation equal to or less than 0.1 meq/g without significantly reducing the molecular weight of the unsaturated polyester polyols. These unsaturated polyester polyols can be used as precursors for polymeric polyols with improved properties with respect to the viscosity, filterability and particle size which facilitate the manufacturing of cellular polyurethane compounds.

DETAILED DESCRIPTION OF THE INVENTION

The invention provides a process to produce an unsaturated polyester polyol which consists of making react (i) an alkylene oxide polyether polyol, (ii) an organic compound which has an ethylenic unsaturation and a hydroxyl, carboxyl, anhydride, isocyanate or epoxy group and (iii) an alkylene oxide selected from ethylene oxide, propylene oxide and mixtures thereof, in the presence of a catalyst, wherein said catalyst is a potassium naphthenate catalyst.

The catalyst concentration (potassium naphthenate) that can be used is, preferably, between 0.1% and 2%, preferably between 0.2% and 1%, in weight with respect to the weight of the alkylene oxide polyether polyol [compound (i)]. Potassium naphthenate is a known product and its use as a catalyst in the synthesis of unsaturated polyester polyols bring about, with respect to the same product produced using calcium naphthenate as a catalyst, a reduction in unsaturation whilst the molecular weights (Mn, Mw, Mv and Mz+1) are very similar [Example 1, Tables 2 and 3], which brings about a modification in the bonding component/soluble component ratio, the first (bonding component) defined by the unsaturation, and the second (soluble component) by the different molecular weights (weight (Mn, Mw, Mv and Mz+1). Said modification in the bonding component/soluble component ratio in the unsaturated polyester polyols produced according to the present invention is translated into a substantial reduction in viscosity and an increase in the filterability of the resulting polymeric polyol produced from said unsaturated polyester polyols as stabilization precursors in the synthesis of polymeric polyols [Example 2, Tables 4 and 5]. The advantages of obtaining unsaturated polyester polyols with lower unsaturation and a variation in the bonding component/soluble component ratio are revealed in their application, principally producing polymeric polyols, with viscosities appreciably lower than those produced with the same product (unsaturated polyester polyol) but obtained with calcium naphthenate.

Alkylene oxide polyether polyols [compound (i)] that can be used in the present invention are well known by those skilled in the art. In a particular embodiment, said compound (i) is an alkylene oxide polyether polyol used in the synthesis of unsaturated polyester polyols useful as precursors for polymeric polyols used in the production of cellular polyurethane compounds. In general, said alkylene oxide polyether polyols [compound (i)] can be produced by conventional processes, e.g.:

a) by catalysis by alkaline metal hydroxides of the reaction between an alkylene oxide, e.g. an alkylene oxide selected from propylene oxide, ethylene oxide and mixtures thereof, and a low molecular weight polyalcohol, such as glycerol, trimethylopropane, monopropylene glycol, dipropylene glycol, sorbitol, sucrose, etc. [see: *Enciclopedia of Chemical Technology*, Vol 7, pag. 257–262, Interscience Publishers, Inc. (1951)]; or b) by the addition of alkylene oxides, e.g. propylene or ethylene oxides, or mixtures thereof, to low molecular weight polyether polyols, produced by the process stated in section a), catalyzed by a double metal cyanide (DMC) according to the processes disclosed, e.g. in the North American patent U.S. Pat. No. 3,427,335.

Preferred alkylene oxide polyether polyols [compound (i)] are those produced by the reaction between an alkylene oxide, e.g. propylene oxide, ethylene oxide or mixtures thereof, and glycerol as a low molecular weight polyalcohol, and have a molecular weight between 200 and 6,000 Dalton. In a particular embodiment, said alkylene oxide polyether polyol is a trifunctional propylene oxide polyether polyol, capped with ethylene oxide, which has a hydroxyl number of 35 KOH/g. Commercialized under the name Alcupol F-3531 (Repsol-YPF).

The organic compound that has an ethylenic unsaturation and a hydroxyl, carboxyl, anhydride, isocyanate or epoxy group [compound (ii)] has the purpose of providing unsaturation to the resulting unsaturated polyester polyol to produce a chemical bond, through the double bond, of the particles of the vinyl copolymer dispersed in the flexible polyether polyol, in the case of producing polymeric polyols. Representative examples of said compound (ii) include mono-, polycarboxylic acids and anhydrides. The preferred compound (ii) is maleic anhydride. Additional illustrative examples of said compound (ii) is stated in the North American patents U.S. Pat. No. 4,144,395 and U.S. Pat. No. 4,550,194, which are incorporated here for reference.

The alkylene oxides [compound (iii)] that can be used in the process provided by this invention to synthesize unsaturated polyester polyols is selected from propylene oxide, ethylene oxide and mixtures thereof. The addition of these alkylene oxides has the purpose of reducing the acidity of the resulting unsaturated polyester polyol with the aim of avoiding them from causing the deactivation of the amines used later as catalysts in the manufacturing of polyurethane foams.

The process provided by this invention permits obtaining an unsaturated polyester polyol with an unsaturation equal to or less than 0.1 meq/g, preferably, less than 0.1 meq/g, an acid value equal to or less than 0.1 mg KOH/f, preferably less than 0.1 mg KOH/g and viscosity at 25° C. equal to or less than 10,000 mPa.s, preferably less than 10,000 mpa.s. In a particular embodiment, said unsaturated polyester polyol has an unsaturation between 0.050 and less than 0.1 meq/g, an acid value less than 0.1 mg KOH7g and a viscosity between 2,200 and 9,000 mPa.s at 25° C. [Example 1, Table 3].

The unsaturated polyester polyols obtained using the process of the invention, can be used as stabilization precursors in the production of polymeric polyols by conventional methods, e.g. in the dispersion of a vinyl polymer or copolymer within a conventional polyol, such as an alkylene oxide polyether polyol. A polymeric polyol is a dispersion of a vinyl polymer or copolymer within a conventional polyol that, to avoid the sedimentation of the vinyl polymer or copolymer, requires stabilization with a steric stabilizer, e.g. an unsaturated polyester polyol. The polymeric polyols produced using, as stabilization precursors, unsaturated polyether polyols synthesized using potassium naphthenate as a catalyst, have, in general, lower viscosity, greater filterability and smaller particle size with respect to the polymeric polyols produced from unsaturated polyols produced using calcium naphthenate as a catalyst [see example 2 and compare the results of Tables 4 and 5]. Said polymeric polyols can be used in the production of cellular polyurethane compounds.

The following examples illustrate the nature of invention and should not be considered restrictive of its scope.

EXAMPLE 1

Production of Unsaturated Polyester Polyols with Calcium Naphthenate (State of the Art) and with Potassium Naphthenate (Invention)

All tests were performed in the same manner. The following products were loaded in a 2-litre capacity Büchi reactor, equipped with stirring, jacket, condenser coil, connection to a vacuum pump and tank to supply propylene oxide:

1,000 g of Alcupol F-3531 (Repsol-YPF) [trifunctional propylene oxide polyether polyol, capped with ethylene oxide and with a hydroxyl number of 35 mg KOH/g]

10 g calcium naphthenate (4% Ca) (Nusa Ibérica)[control group for the comparative test];

5 g potassium naphthenate (10% K) (Nusa Ibérica) [according to the process of the invention]; and maleic anhydride in accordance with the quantities indicated in table 1.

Once the reactor was closed, it was purged five times with nitrogen (2 kg/cm$^2$, each time) leaving a slight nitrogen pressure. Next, it was heated to 145° C. and was maintained at this temperature for 1 hour. A vacuum was then created (once this was done, it was closed and the vacuum pump was stopped) and it was maintained at 145° C. Next, we began loading propylene oxide in accordance with the quantities indicated in Table 1. It was left to react for 3 or 6 hours (Table 1) and, then, whilst lowering the temperature to 110° C., a vacuum was created for 1 hour to eliminate the propylene oxide. It was finally cooled to 50° C. and the unsaturated polyester polyols produced in each case were collected, and called "Precursors" and identified by a number (which corresponded to the test number) and the letters "Ca" or "K", indicative of the origin of the precursor (Ca: calcium naphthenate catalyst; K: potassium naphthenate catalyst).

TABLE 1

Test conditions for precursors 1–8 synthesized with calcium naphthenate or potassium naphthenate.

| Test no. | Maleic Anhydride (g) | Propylene oxide (g) | Time (hours) |
|---|---|---|---|
| 1 | 15.0 | 123 | 3 |
| 2 | 19.8 | 123 | 6 |
| 3 | 15.0 | 123 | 6 |
| 4 | 19.8 | 63 | 6 |
| 5 | 19.8 | 63 | 3 |
| 6 | 15.0 | 63 | 3 |
| 7 | 19.8 | 123 | 3 |
| 8 | 15.0 | 63 | 6 |

The unsaturated polyether polyols obtained were analysed, determining the following parameters:

viscosity (η) at 25° C., determined in cps (mPa.s), was measured in a Brookfield viscometer, model: DV-III;

density (D) at 25° C., determined in g/cc, was measured using conventional areometers.

the acid value (Acidity), expressed in mg KOH/g, was determined according to the DIN 53402 standard;

the unsaturation, expressed in meq/g of the sample, was chemically defined according to the process indicated in the patent U.S. Pat. No. 4,652,589;

fumaric unsaturation (% fumarate), was determined by nuclear magnetic resonance (NMR); and the different molecular weights, Mn, Mw, Mv and Mz+1, expressed in Dalton (DA), were determined by GPC (molecular exclusion chromatography).

The results of the unsaturated polyester polyols produced using calcium naphthenate as a catalyst [precursors 1–8 Ca] are set down in Table 2, whilst the results of the unsaturated polyester polyols produced using potassium naphthenate as a catalyst [precursors 1–8 K] are set down in table 3.

TABLE 2

Results of the unsaturated polyester polyols synthesized with calcium naphthenate [Precursors 1–8 Ca]

| Test no. | η mPa · s | D g/cc | Acidity mg KOH/g | Unsaturation meq/g | Fumarate % | Mn Dalton | Mw Dalton | Mv Dalton | Mz + 1 Dalton |
|---|---|---|---|---|---|---|---|---|---|
| 1 | 4334 | 1.024 | 0.008 | 0.112 | 100 | 6014 | 9777 | 8901 | 19980 |
| 2 | 4025 | 1.022 | 0.011 | 0.150 | 100 | 6008 | 9401 | 8648 | 18107 |
| 3 | 3125 | 1.021 | 0.021 | 0.104 | 100 | 5192 | 8712 | 7924 | 18614 |

TABLE 2-continued

Results of the unsaturated polyester polyols synthesized with calcium naphthenate [Precursors 1–8 Ca]

| Test no. | η mPa·s | D g/cc | Acidity mg KOH/g | Unsaturation meq/g | Fumarate % | Mn Dalton | Mw Dalton | Mv Dalton | Mz + 1 Dalton |
|---|---|---|---|---|---|---|---|---|---|
| 4 | 2906 | 1.020 | 0.010 | 0.102 | 100 | 5236 | 8577 | 7839 | 17940 |
| 5 | 4096 | 1.022 | 0.002 | 0.137 | 100 | 5281 | 9226 | 8407 | 18586 |
| 6 | 4384 | 1.022 | 0.003 | 0.145 | 100 | 6258 | 9899 | 9092 | 19114 |
| 7 | 2905 | 1.021 | 0.002 | 0.113 | 100 | 5816 | 8823 | 8126 | 17806 |
| 8 | 2949 | 1.020 | 0.002 | 0.109 | 100 | 5702 | 8619 | 7946 | 17237 |

TABLE 3

Results of the unsaturated polyester polyols synthesized with potassium naphthenate [Precursors 1–8 K]

| Test no. | η mPa·s | D g/cc | Acidity mg KOH/g | Unsaturation meq/g | Fumarate % | Mn Dalton | Mw Dalton | Mv Dalton | MZ + 1 Dalton | K* % |
|---|---|---|---|---|---|---|---|---|---|---|
| 1 | 2774 | 1.023 | 0.002 | 0.074 | 89.2 | 5339 | 8815 | 7982 | 19229 | 0.049 |
| 2 | 4723 | 1.024 | 0.002 | 0.081 | 90.7 | 6320 | 11101 | 9993 | 22702 | 0.048 |
| 3 | 3002 | 1.022 | 0.002 | 0.065 | 92.0 | 5779 | 9428 | 8543 | 20259 | 0.048 |
| 4 | 5023 | 1.025 | 0.002 | 0.081 | 88.3 | 5606 | 10778 | 9649 | 22433 | 0.048 |
| 5 | 4255 | 1.023 | 0.002 | 0.094 | 89.0 | 5901 | 10273 | 9257 | 21411 | 0.049 |
| 6 | 2758 | 1.023 | 0.002 | 0.078 | 89.5 | 5542 | 9258 | 8360 | 20475 | 0.047 |
| 7 | 4481 | 1.025 | 0.002 | 0.093 | 90.2 | 5832 | 10815 | 9718 | 22549 | 0.049 |
| 8 | 2996 | 1.023 | 0.002 | 0.055 | 92.9 | 5563 | 9497 | 8539 | 21094 | 0.048 |

(Mn) (number average molecular weight) = $\Sigma NiMi/\Sigma Ni$. Where MI is $xM_o$ with $M_o$ the molecular weight of the structural unit and x the degree of polymerization and Ni is the number of molecules of said molecular species.
Mw (weight average molecular weight) = $\Sigma NiMi^2/\Sigma NiMi$, where Mi and Ni have the aforementioned meanings.
Mv (viscosity average molecular weight) = $[\Sigma NiMi^{1-a}/\Sigma NiMi]^{1/a}$ where Mi and Ni have the aforementioned meanings and ranges from 0.5 to 0.85.
Mz + 1 (Z + 1 average molecular weight) = $\Sigma NiMi^4/\Sigma NiMi^3$ where Mi and Ni have the aforementioned meanings-
The % in weight of K (potassium) was determined by atomic absorption.

From Tables 2 and 3 above, it is clearly gathered, that with equality of formulation, potassium naphthenate produces an appreciably lower unsaturation in the unsaturated polyester polyols synthesized using said catalyst than that produced in the polyester polyols using calcium naphthenate, whilst the respective molecular weights remain practically invariable.

EXAMPLE 2

Preparation of Polymeric Polyols

The corresponding polymeric polyols were prepared with each one of the unsaturated polyester polyols (precursors) produced and characterized in Example 1, in accordance with the following composition:

| | |
|---|---|
| Alcupol F-4841 | 444.00 g (55.50%) |
| Precursor | 32.00 g (4.00%) |
| Styrene | 212.80 g (26.60%) |
| Acrylonitrile | 106.40 g (13.30%) |
| PBQ | 0.80 g (0.10%) |
| AIBN | 4.00 g (0.50%) |
| Total | 800.00 g |

The Alcupol F-4841, produced by Repsol-YPF, is a trifunctional propylene polyether polyol and a random mixture of propylene oxide/ethylene oxide, which has a hydroxyl number of 48 mg KOH/g.

The styrene, produced by Repsol-YPF, is a monomer in accordance with the typical market specifications.

The acrylonitrile, produced by Repsol-YPF, is a monomer in accordance with the typical market specifications.

PBQ (Para-benzoquinone) is a chain transfer agent produced by Rhodia.

AIBN (Azo bis iso butyronitrile), produced by Azko Nobel.

The precursors used correspond to the unsaturated polyester polyols obtained in Example 1 [if using calcium naphthenate (precursors 1–8 Ca) and, in the other case, potassium naphthenate (precursors 1–8 K) as a catalyst].

The experimental process consists of initially adding 300 g Alcupol F-4841 and 32 g of the corresponding precursors to a Büchi reactor. Next, heat to 125° C. under nitrogen atmosphere. Having reached this temperature, in 3 hours, a solution constituted from 144.00 g of Alcupol F-4841, 212.80 g styrene, 106.40 g acrylonitrile, 0.80 g PBQ and 4.00 g AIBN was added using a peristaltic pump at atmospheric pressure. Having concluded the addition, it was left for a post-reaction period of approximately 30 minutes whilst the residual monomers were vacuum evacuated for 2 hours. It was then cooled to 60° C. and the resulting products (polymeric polyols) were removed.

The results of the analysis and characterization of the polymeric polyols produced using, as precursors, the unsaturated polyester polyols synthesized using calcium naphthenate (precursors 1–8 Ca) as a catalyst are set down in Table 4, whilst in Table 5, the results of the analysis and characterization of the polymeric polyols produced using as precursors the unsaturated polyester polyols synthesized using potassium naphthenate(precursor 1–8 K).

TABLE 4

Characteristics of the polymeric polyols synthesized with unsaturated polyester polyols produced using calcium naphthenate as catalyst. (Precursors 1–8 Ca)

| Test no. | D (g/cc) | Humidity (%) | Acidity (mg KOH/g) | D(0.9) Microns | Filterability (g/min) | η (mPa · s) |
|---|---|---|---|---|---|---|
| 1 | 1.042 | 0.063 | 0.056 | 0.54 | 1.09 | 6934 |
| 2 | 1.041 | 0.017 | 0.042 | 0.55 | 1.40 | 6892 |
| 3 | 1.041 | 0.010 | 0.038 | 0.54 | 2.40 | 4259 |
| 4 | 1.041 | 0.080 | 0.036 | 0.55 | 1.90 | 5999 |
| 5 | 1.041 | 0.052 | 0.036 | 0.51 | 0.84 | 6871 |
| 6 | 1.041 | 0.016 | 0.032 | 0.52 | 1.76 | 6280 |
| 7 | 1.041 | 0.046 | 0.034 | 0.51 | 1.61 | 4828 |
| 8 | 1.041 | 0.020 | 0.040 | 0.50 | 1.54 | 5915 |
| Average | | | | 0.53 | 1.57 | 5350 |

TABLE 5

Characteristics of the polymeric polyols synthesized with unsaturated polyester polyols produced using potassium naphthenate as catalyst. (Precursors 1–8 K)

| Test no. | D (g/cc) | Humidity (%) | Acidity (mg KOH/g) | D(0.9) Microns | Filterability (g/min) | η (mPa · s) |
|---|---|---|---|---|---|---|
| 1 | 1.041 | 0.033 | 0.041 | 0.47 | 2.73 | 3099 |
| 2 | 1.041 | 0.045 | 0.053 | 0.51 | 1.69 | 5104 |
| 3 | 1.041 | 0.030 | 0.053 | 0.51 | 2.33 | 4285 |
| 4 | 1.041 | 0.034 | 0.046 | 0.47 | 1.09 | 5023 |
| 5 | 1.041 | 0.034 | 0.044 | 0.47 | 1.22 | 5114 |
| 6 | 1.040 | 0.066 | 0.063 | 0.47 | 1.74 | 3515 |
| 7 | 1.041 | 0.077 | 0.042 | 0.48 | 1.08 | 5270 |
| 8 | 1.041 | 0.029 | 0.043 | 0.47 | 2.30 | 4092 |
| Average | | | | 0.48 | 1.77 | 4438 |

D(0.9) expressed in microns, is the maximum size of 90% of the distribution of vinyl copolymer particles in the polymeric polyol measured in a Malvern Mastersizer E apparatus.

The filterability is the rate, expressed in g/min, at which 20 g of polymeric polyol pass through a 53 microns mesh gauge with 13 cm radius.

The comparison of the results shown in Tables 4 and 5 shows that, when precursors 1–8 K are used, there is a substantial improvement in the filterability of the polymeric polyols produced whilst there is an appreciable reduction in viscosity and even as slight reduction in the particle size of said polymeric polyols produced, which facilitates the use of these products to manufacture cellular polyurethane compounds.

What is claimed is:

1. A process to produce an unsaturated polyester polyol that consists of reacting (i) an alkylene oxide polyether polyol, (ii) an organic compound that has an ethylenic unsaturation and a hydroxyl, carboxyl, anhydride, isocyanate or epoxy group and (iii) an alkylene oxide selected from ethylene oxide, propylene oxide and the mixtures thereof, in the presence of a catalyst, wherein said catalyst is potassium naphthenate.

2. Process according to claim 1, wherein the concentration of potassium naphthenate is between 0.1% and 2% in weight, with respect to the weight of the alkylene oxide polyether polyol.

3. Process according to claim 1, wherein the reaction between compounds (i), (ii) and (iii), in the presence of said catalyst, is carried out at a temperature between 90° C. and 160° C.

4. A process according to claim 1, wherein said alkylene oxide polyether polyol (i) is the product of the reaction of an alkylene oxide and a compound selected from a low molecular weight polyalcohol and a low molecular weight polyether.

5. Process according to claim 4, wherein said low molecular weight polyalcohol is glycerine and the resulting alkylene oxide polyether polyol (i) has a molecular weight between 200 and 6,000 Dalton.

6. Process according to claim 1, wherein said alkylene oxide polyether polyol (i) is a trifunctional propylene oxide polyether polyol, capped with ethylene oxide, which has a hydroxyl number of 35 mg KOH/g.

7. Process according to claim 1, wherein said organic compound that has an ethylenic unsaturation and a hydroxyl, carboxyl, anhydride, isocyanate or epoxy group (ii) is maleic anhydride.

8. Process according to claim 1, wherein the unsaturated polyester polyol produced has an unsaturation equal to or less than 0.1 meq/g, a viscosity equal to or less than 10,0000 mPa.s at 25° C. and an acid value equal to or less than 0.1 mg KOH/g.

9. Process according to claim 1, wherein the unsaturated polyester polyol produced has an unsaturation between 0.050 and less than 0.1 meq/g, a viscosity between 2,200 and 9,000 mPa.s and an acid number equal to or less than 0.1 mg KOH/g.

* * * * *